(12) United States Patent
Pishnyak (10) Patent No.: US 8,947,604 B2
(45) Date of Patent: Feb. 3, 2015

(54) CHOLESTERIC LIQUID CRYSTAL WRITING TABLET WITH SPACER CONTROLLED SENSITIVITY

(75) Inventor: Oleg Pishnyak, Kent, OH (US)

(73) Assignee: Kent Displays Incorporated, Kent, OH (US)

( * ) Notice: Subject to any disclaimer, the term of this patent is extended or adjusted under 35 U.S.C. 154(b) by 750 days.

(21) Appl. No.: 13/281,911

(22) Filed: Oct. 26, 2011

(65) Prior Publication Data

US 2012/0099030 A1 Apr. 26, 2012

Related U.S. Application Data (60) Provisional application No. 61/406,749, filed on Oct. 26, 2010.

(51) Int. Cl.
| | | |
|---|---|---|
| *G02F 1/1335* | (2006.01) | |
| *G02F 1/1339* | (2006.01) | |
| *C09K 19/02* | (2006.01) | |
| *G06F 3/033* | (2013.01) | |
| *G02F 1/1333* | (2006.01) | |
| *G02F 1/137* | (2006.01) | |

(52) U.S. Cl.
CPC ...... *G02F 1/133305* (2013.01); *G02F 1/13338* (2013.01); *G02F 1/13392* (2013.01); *G02F 1/13718* (2013.01)
USPC .............. 349/12; 349/155; 349/185; 345/179

(58) Field of Classification Search
USPC ............ 349/12, 155–157, 175, 185; 345/176, 345/178, 179
See application file for complete search history.

(56) References Cited

U.S. PATENT DOCUMENTS

| | | | |
|---|---|---|---|
| 6,061,107 A | 5/2000 | Yang et al. | |
| 6,104,448 A | 8/2000 | Doane et al. | |
| 7,351,506 B2 | 4/2008 | Schneider et al. | |
| 2003/0071958 A1* | 4/2003 | Wu et al. ................. | 349/156 |
| 2006/0182898 A1 | 8/2006 | Ben-Shalom et al. | |
| 2007/0085837 A1 | 4/2007 | Ricks et al. | |
| 2009/0033811 A1 | 2/2009 | Schneider | |
| 2009/0096942 A1 | 4/2009 | Schneider et al. | |
| 2010/0265214 A1 | 10/2010 | Green et al. | |

OTHER PUBLICATIONS

International Search Report and Written Opinion completed on Apr. 25, 2012 and mailed on May 4, 2012 of corresponding International Application No. PCT/US2011/057891 filed Oct. 26, 2011.

* cited by examiner

*Primary Examiner* — Paul Lee
(74) *Attorney, Agent, or Firm* — Pearne & Gordon LLP (57) ABSTRACT

A cholesteric liquid crystal writing tablet includes a first substrate that is transparent and flexible on which a writing pressure is applied and a second substrate spaced apart from the first substrate. One electrically conductive layer is in contact with the first substrate and is transparent and another of the electrically conductive layers is in contact with the second substrate. The electrically conductive layers are separated from each other by a cell gap. Cholesteric liquid crystal material is disposed between the electrically conductive layers. Spacers are disposed in the liquid crystal material that control the cell gap. The spacers have a size and concentration in the liquid crystal material that restricts flow of the liquid crystal material when the cell gap is reduced upon application of the writing pressure.

25 Claims, 6 Drawing Sheets

CHOLESTERIC LIQUID CRYSTAL WRITING TABLET WITH SPACER CONTROLLED SENSITIVITY

TECHNICAL FIELD

This disclosure pertains to electronic writing tablets and, in particular, to writing tablets that employ cholesteric liquid crystal material.

BACKGROUND

A cholesteric liquid crystal display is sensitive to external stresses, such as applied pressure or mechanical deformations. The external stress locally changes the gap between the substrates of the display device causing the material flow to spread far from the point of applied stress. Because of the anisotropy in the viscosity of the cholesteric liquid crystal, flow in the gap between substrates creates the planar texture. As a result, the cholesteric display device reflects colored light where the surface of the display is touched and a slight pressure applied. The effect is significantly pronounced when the display is assembled from flexible substrates. Pressure sensitivity can be largely eliminated in a cholesteric display with the use of polymer dispersions where the liquid crystal is encapsulated in the form of droplets within a polymer (see for example U.S. Pat. Nos. 6,061,107 and 7,351,506).

Reduced pressure sensitivity of cholesteric liquid crystals, however, can be utilized to create a writing tablet. Pressure of a stylus on a flexible substrate creates a planar texture image on a focal conic background as described in U.S. Pat. No. 6,104,448. In this application the pressure sensitivity of the cholesteric liquid is limited by the polymer network structure so that the sensitivity to the stylus is controlled, enabling one to trace a well defined line (see U.S. Patent Application Publications 2009/0033811 and 2009/0096942, which are incorporated herein by reference in their entireties). As described in patent publication 2009/0033811, polymer networks are employed to reduce the pressure sensitivity of a cholesteric material so that the pressure created from the tip of a stylus can produce a high resolution image whereas the diffuse pressure of say the hand holding the stylus, does not destroy the image when resting on the display surface. It would be advantageous to develop a writing tablet that employs cholesteric liquid crystal material but does not need polymer in the liquid crystal material to restrict its flow and to provide suitable resolution of the image, when writing pressure is applied to the writing tablet.

TECHNICAL SUMMARY

A cholesteric liquid crystal display comprises two substrates, an electrically conductive layer in contact with each of the substrates, cholesteric liquid crystal material sandwiched between the electrically conductive layers and spacers distributed in the liquid crystal material. We disclose a writing tablet display with a pressure sensitivity controlled by the number and size of the spacers. The characteristics of the spacers satisfy the formula: $0.2 \leq (A_d - A_s)/A_d < 1$, where $A_d$ is the entire writing area of the tablet display and $A_s$ is the total area occupied by all spacers as projected on a substrate surface within the writing area of the display. $A_s$ is defined as a sum of areas of the individual spacers as follows:

$$A_s = \sum_{i=1}^{n} A_i,$$

where n is the total number of spacers within the writing area of the display. The flow of the liquid crystal is controlled by the characteristics of the spacers in the formula concerning aperture ratio, $(A_d - A_s)/A_d$.

Regarding more specific variations of the cholesteric display, the cholesteric liquid crystal material can be polymer-free avoiding the need for polymer networks.

The spacers can be prefabricated shapes set into fixed positions bound to one or both of the substrates (e.g., crosses or posts as spacers) or they can be spherical or other shaped spacers locked into position on one or both substrates such as may be implemented by an adhesive or patterned structure on the substrate. Spacers may also be embedded into a polyimide layer coated on one or both substrates. The size of the spacers and spacing between them defines the pressure sensitivity of the writing tablet and hence the resolution of the written image.

The gap between the electrically conductive layers can be approximately the same as the height of the spacers. The area of the spacers $A_s$ within the display writing area $A_d$ can be varied to achieve the desired sensitivity of the device and satisfy the formula for the aperture ratio $0.2 \leq (A_d - A_s)/A_d < 1$. The controlled flow of the liquid crystal material allows for the visualization of writing on the surface of the display that is electrically switched to the focal conic state or to the planar state as an initial state. The device includes drive electronics connected to the electrically conductive layers that apply voltages that enable the liquid crystal material to be switched to the focal conic and/or planar textures. Typically, at least the upper substrate that is closest to the viewer is transparent and at least the upper electrically conductive layer is transparent. The user can apply the pressure of a stylus or a fingernail to the upper substrate to create the writing on the display due to controlled flow of the liquid crystal. At least the upper substrate is flexible (e.g., flexible polymer). The lower substrate can be flexible polymer or rigid (glass, for example). The display can include multiple stacked liquid crystal layers with substrates sandwiching each liquid crystal layer, which are preferably all flexible plastic or polymer. One or two substrates can be disposed between adjacent liquid crystal layers. The substrates between liquid crystal layers can have an electrically conductive layer on one or both sides thereof. The device can include a light absorbing layer (e.g., a black layer) on the back of the display to absorb light passing through the liquid crystal material. The device can be composed of one colored liquid crystal layer or multiple liquid crystal layers of different colors. Portions of the device can be also be selectively erased to restore the original background color.

A first embodiment of the disclosure features a cholesteric liquid crystal writing tablet. A first transparent substrate is flexible on which a writing pressure is applied and a second substrate is spaced apart from the first substrate. There are electrically conductive layers, one of which is in contact with the first substrate and is transparent and another of which is in contact with the second substrate. The electrically conductive layers are separated from each other by a cell gap. Cholesteric liquid crystal material is disposed between the electrically conductive layers. Spacers are disposed in the liquid crystal material and control the cell gap. The spacers have a size and concentration in the liquid crystal material that restrict flow of the liquid crystal material when the cell gap is reduced upon application of the writing pressure, thereby forming writing on the writing tablet.

Referring to specific features of the first embodiment, the spacers can satisfy the formula: $0.2 \leq (A_d - A_s)/A_d < 1$, where $A_d$ is an entire writing area of the writing tablet on which the writing can be made and $A_s$ is the total area occupied by all spacers as projected on the first substrate or the second substrate within the writing area. In one aspect $0.4 \leq (A_d - A_s)/A_d < 1$. Alternatively, $0.2 \leq (A_d - A_s)/A_d \leq 0.9$.

Still further, the spacers can have a non-spherical shape, which can be selected from the group consisting of, cylindrical, rectangular, a cross-shaped, and a combination thereof. The spacers can be formed by microembossing, stamping or photolithography. The spacers can be thermally bonded to at least one of the electrically conductive layers or adhered to at least one of the electrically conductive layers with adhesive. The spacers can be disposed directly on or as part of at least one of the first substrate and the second substrate, or on at least one of the electrically conductive layers. The spacers can have a height that is greater than or equal to the cell gap. The spacers can be flexible or rigid. Some of the spacers can have a height that is approximately the same as the cell gap while others of the spacers can have a height smaller than the cell gap. A layer of alignment material can be in contact with the liquid crystal material, which orients the liquid crystal molecules and may improve the electrooptical properties of the tablet. The spacers can be thermally bonded to the alignment layer material, or adhered to or formed on the alignment layer material. The spacers can be positioned in an ordered pattern in the liquid crystal material. The liquid crystal material can be free from a polymer network or free from all polymer, or can contain polymer.

The writing tablet can include drive electronics for placing the liquid crystal material into a focal conic texture or a planar texture as an initial state for erasing the tablet, or to assist in writing on the tablet. The drive electronics and method of driving the inventive writing tablet display with spacer controlled sensitivity is the same as that described for writing single liquid crystal layer and multiple liquid crystal layer tablets with polymer networks as described in U.S. Pat. No. 6,104,448 and U.S. patent application Publications 2009/0033811 and 2009/0096942. In one mode of operation, the single layer tablet is initialized or erased to the focal conic texture with a voltage pulse applied to the electrodes then the written image is made with the pressure of a stylus without any voltage applied to the electrodes. In another mode, the single layer tablet is initialized or erased to the planar texture with a voltage pulse applied to the electrodes of magnitude sufficient to drive the cholesteric liquid crystal material to the planar texture. The written image is created with the pressure of a stylus in the presence of a voltage applied to the electrodes of sufficient value to create the focal conic texture. Multiple layer tablets likewise have two possible modes of operation, one mode where all layers are erased to the focal conic texture and another mode where all layers are erased to the planar texture. All layers or colors may be written simultaneously with a stylus or selected layers or colors may written by application of voltages as necessary to appropriate electrodes as described in U.S. patent application Publications 2009/0033811 and 2009/0096942.

Still further, a light absorbing layer can be positioned to absorb light passing through the liquid crystal material. The first substrate can comprise flexible polymer. There can be multiple stacked liquid crystal layers comprising liquid crystal material. The liquid crystal material of one of the liquid crystal layers can reflect light of a different color than the liquid crystal material of another of the liquid crystal layers. A first of the liquid crystal layers can reflect red light, a second of the liquid crystal layers can reflect green light and a third of the liquid crystal layers can reflect blue light, in any order. The cholesteric liquid crystal material in the writing tablet can be bistable.

A second embodiment of this disclosure features a cholesteric liquid crystal writing tablet. A first substrate is flexible on which a writing pressure is applied and a second substrate is spaced apart from the first substrate. There are electrically conductive layers, one of which is in contact with the first substrate and another of which is in contact with the second substrate. The electrically conductive layers are separated from each other. Cholesteric liquid crystal material is disposed between the electrically conductive layers. Spacers are disposed in the liquid crystal material. The spacers satisfy the formula: $0.2 \leq (A_d - A_s)/A_d \leq 0.9$, where $A_d$ is an entire writing area of the writing tablet on which writing can be made due to application of the writing pressure and $A_s$ is the total area occupied by all spacers as projected on the first substrate or the second substrate within the writing area.

Referring to specific features of the second embodiment, the spacers can be positioned in an ordered pattern in the liquid crystal material. The liquid crystal material can be free from a polymer network or free from all polymer. The first substrate and the one electrically conductive layer can be transparent. Drive electronics can be used for placing the liquid crystal material into a focal conic texture or a planar texture as an initial state or to assist in writing on the writing tablet.

Any of the specific features described above in connection with the first embodiment and in the Detailed Description can be used with the second embodiment in any order.

Many additional features, advantages and a fuller understanding of the invention will be had from the accompanying drawings and the Detailed Description that follows. It should be understood that the above Brief Description of the Invention describes the invention in broad terms while the following Detailed Description describes the invention more narrowly and presents preferred embodiments that should not be construed as necessary limitations of the broad invention as defined in the claims.

BRIEF DESCRIPTION OF THE DRAWINGS

FIG. 1a: A drawing of a lower substrate of the writing tablet device of this disclosure utilizing prefabricated spacers (posts);

FIG. 1b: a drawing of the assembled writing tablet including the lower substrate and spacers shown in FIG. 1a;

FIG. 6 (a-d): Photographs of writing tablet devices with prefabricated spacer structures of different periodicity as asymmetrical crosses; and FIG. 6 (e-h): Photographs of writing tablet devices with prefabricated spacer structures of different periodicity as cylindrical posts.

DETAILED DESCRIPTION

A cholesteric liquid crystal display (e.g., a writing tablet) stabilized by prefabricated spacer structures is disclosed. The spacer structures are arranged in such a way that the display can be made moderately insensitive to deformations, such as bending, but with controlled sensitivity to the applied localized pressure such as is required for a writing tablet. Under localized pressure the display switched to the initial focal conic state locally changes its state to the reflective planar state allowing for the visualization of writing on the surface of the display. That is, the bright color planar (reflective) texture of the writing contrasts with the surrounding focal conic (weakly scattering) texture that shows the light absorbing layer in the background. The display is assembled from two substrates (preferably flexible) with conductive electrodes formed on or applied to the substrates. The electrodes can be patterned but are unpatterned in particular (i.e., a continuous sheet of the electrode across the entire writing area). One or both substrates or electrically conductive layers have prefabricated spacer structures formed on or applied to them. The spacers may be attached to the top or bottom conductive layers or to both the top and bottom conductive layers. In the case of microembossing, for example, the spacers can be formed directly from the substrate. The spacers are formed of electrically insulating material, e.g., cured polymer, photoresist material or glass. The spacers may be in the form of posts, crosses or cylinders, for example, or other symmetric or asymmetric shapes. These shapes can form prisms.

The prefabricated spacer structures can be made by a photolithography technique, stamping, deposition methods, formed on the substrate by microembossing, etc. and are intended to control not only the flow of cholesteric material, but also to set or control the gap between the substrates. In the case of photolithography the photosensitive material is deposited on top of the conductive layer and irradiated through the shadow mask. Then the spacers are formed by an etching process by removing the exposed regions of photoresist (or non-exposed regions in the case of negative photoresist). In the case of stamping the spacers of desired shape and height are deposited on top of conductive layers with a specifically designed stamp. In a microembossing process the spacers are formed from the substrate or from the layer of polymer coated on top of the substrate or on top of conductive layer with a specifically designed mold. Spacers can be adhered to the conductive layers or to the substrate by adding some amount of polymer.

Two substrates are then bonded together and filled with cholesteric liquid crystal by a vacuum filling or capillary method. The display can also be assembled by depositing of cholesteric material between the substrates and laminating two substrates together in the case when one or two substrates are flexible. Flow control of cholesteric material can be also achieved without prefabricated, ordered spacer structures by a proper concentration of spacers in the liquid crystal material uniformly but randomly distributed on one or on both substrates before the display assembly. Spacers can be also introduced into the device during the lamination step by mixing a proper concentration of spacers with cholesteric material, deposing the mixture between two substrates and then laminating two substrates together. Flow control can be also achieved in cholesteric liquid crystals with higher viscosity, by using cholesteric liquid crystal polymers, by adding colloidal nanoparticles, for example, or other dopants affecting (e.g., increasing) the viscosity of the cholesteric material. Prior technology used polymer networks to control the flow of the cholesteric liquid crystal; however, in that technology spacers were only used to achieve the desired cell gap spacing between the electrodes.

As discussed above, the density of the spacer structures can be characterized by the aperture ratio, $(A_d-A_s)/A_d$, where $A_s$ is the entire area of the structures as projected on the surface of the substrates within the writing area of the display $A_d$. The usable range of $(A_d-A_s)/A_d$ ratio for creating a writing tablet device can vary between greater than or equal to 0.2 and less than 1 (i.e., $0.2 \leq (A_d-A_s)/A_d < 1$) and, in particular, $0.4 \leq (A_d-A_s)/A_d < 1$, or in particular, $0.2 \leq (A_d-A_s)/A_d \leq 0.9$.

The aperture ratio value that is selected (i.e., the choice of $A_d$ and $A_s$) depends on (a) pressure sensitivity desired for the device; (b) viscosity of the cholesteric liquid crystal material; and (c) shape, size and spacing of the prefabricated spacer structures. Clearly, the larger the aperture ratio $(A_d-A_s)/A_d$ the more incident light will be reflected by the cholesteric material, so the reflectance of the display will be increased. The pressure sensitivity is likewise increased with a larger aperture ratio. The higher the viscosity of cholesteric material the larger $(A_d-A_s)/A_d$ can be allowed for a desired sensitivity. Typically the cell gap of the device is near 5 μm. The value of the aperture ratio that is selected for a given display will depend on cell gap too. A larger cell gap allows a smaller aperture ratio for a given sensitivity; however it adds to the cost of the tablet because more liquid crystal is required. Also a larger cell gap requires a higher operating voltage. A smaller cell gap can also have disadvantages in that unwanted particulates (e.g., dust particles) of this size or larger that destroy cell uniformity are harder to remove. The inventive tablet device takes advantage of the spacers to not only control the size of the cell gap but also control the flow of the cholesteric liquid crystal under the pressure of a stylus. This avoids the need for polymer networks of prior art tablet technology where the networks were used to control the flow and spacers used only to establish a uniform cell gap.

FIG. 1a describes the writing tablet device comprising the bottom substrate 10 with light absorbing layer 60 and prefabricated spacer structures 20 bonded to the electrodes 40. The area of the spacer structures $$A_s = \sum_{i=1}^{n} A_i$$

can be varied depending on the pressure sensitivity desired, where n is the total number of spacers in the writing area of the writing tablet. The top substrate 30 is then attached to the bottom substrate 10. Both substrates have conductive electrodes 40 formed on or applied to them. The cell gap d is the distance between the electrically conductive layers or electrodes 40, with a suitable range being between 2 and 7 microns, for example. The electrodes are unpatterned in all examples and figures of this disclosure. The assembled device is filled with cholesteric liquid crystal 50 in the cell gap, which is bistable in the display (FIG. 1b).

The prefabricated spacer structures localize the flow of cholesteric liquid crystal occurring under external pressure within some area which depends on the applied pressure. The spacer structures also set or control the spacing between two substrates. Prefabricated spacer structures can be (e.g., rectangular posts) deposited on one substrate as shown in FIG. 1a or on both substrates. Although all of the spacers are shown in FIG. 1b as touching both electrically conductive layers, not all spacers need to touch both electrodes; some of the spacers may have a height smaller than the cell gap.

Voltages and voltage pulses are applied to the electrodes 40 with drive electronics 15. The drive electronics is used to initialize the tablet before writing or to erase a written image, and can be used to assist in forming the writing. For a tablet with a single layer of cholesteric liquid crystal, as illustrated in FIG. 1b, there are two possible modes of operation. In one mode the tablet is initialized or erased to the focal conic texture with a voltage pulse or sequence of pulses as described in U.S. Pat. No. 6,104,448 and U.S. Patent Application Publications 2009/0033811 and 2009/0096942. An image is written on the tablet with the pressure of a pointed stylus or, for example, the finger nail. No voltage is applied to the electrodes while the image is written in this mode. In another mode the tablet is initialized or erased with a sequence of pulses of sufficient magnitude to drive the cholesteric liquid crystal to the reflective planar texture. An image is written on the tablet with the pressure of a pointed stylus but in this mode with a voltage applied to the electrodes while writing the image. The voltage levels and pulse magnitudes applied by the drive electronics 15 are described in U.S. Patent Application Publications 2009/0033811 and 2009/0096942.

Figure 1:
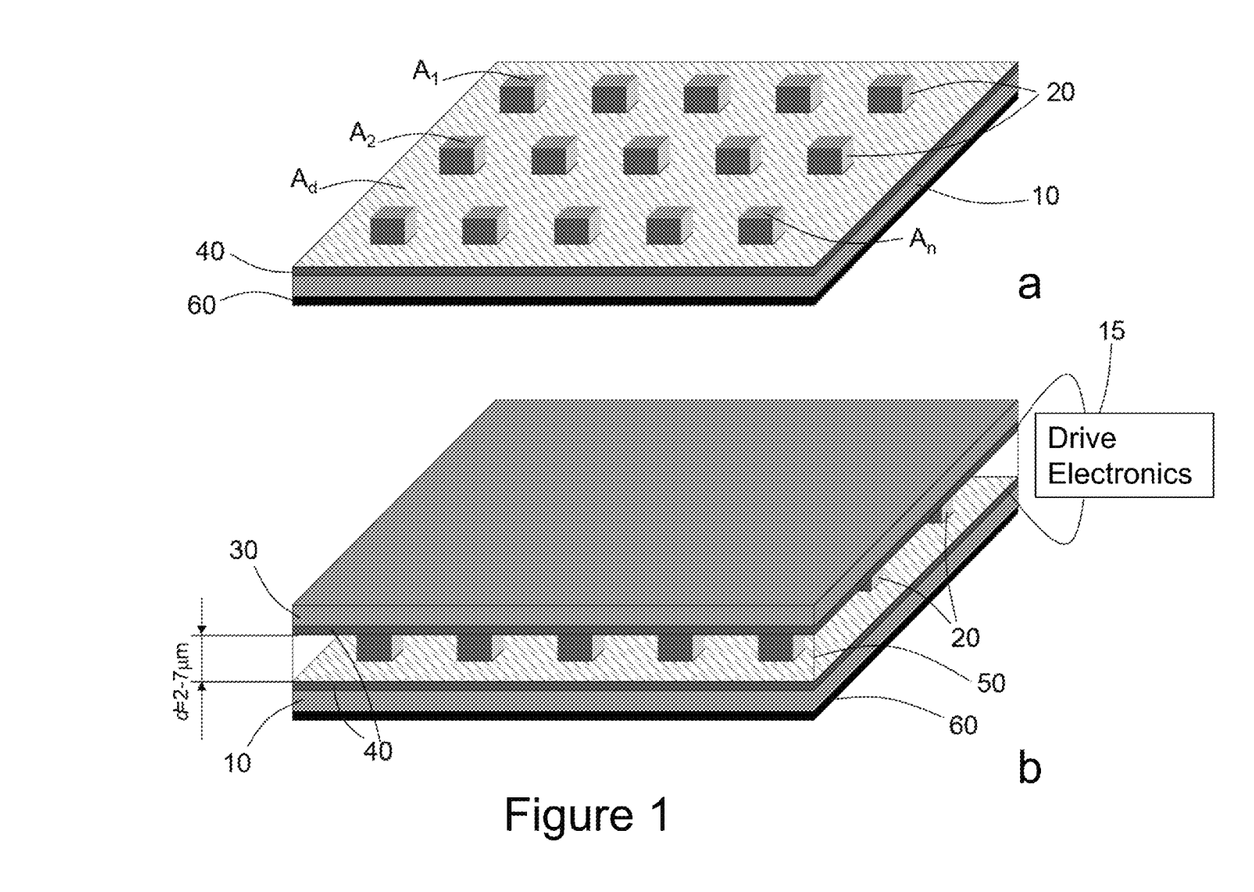
Figure 2:
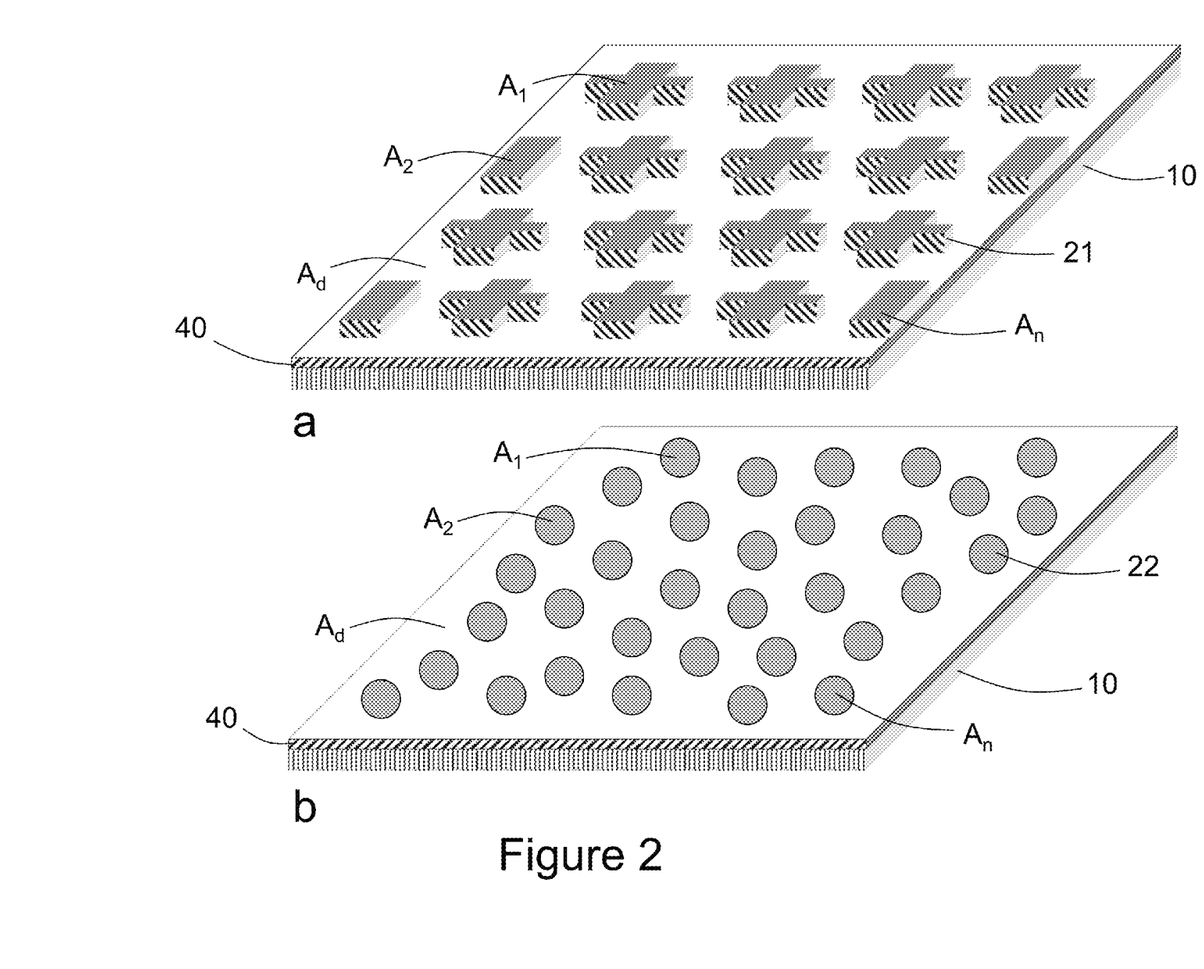
FIG. 2a: A drawing of a lower substrate of the writing tablet device utilizing prefabricated ordered cross-shaped walls.
FIG. 2b: A drawing of a lower substrate of the writing table device utilizing: dispersed spherical spacers.

FIG. 2 describes the writing table device with other spacer structures to control flow of cholesteric material: prefabricated cross-shaped walls 21 formed by a photolithography technique on substrate 10 (FIG. 2a) with conductive layer 40 between the spacers and the substrate. Alternatively, shown are spherical spacers 22 dispersed on the substrate 10 (FIG. 2b). Regularly spaced or ordered spacers can be also of cylindrical shape uniformly distributed between two substrates. The function of deposited structures is to control the flow of liquid crystal material and to set the gap between two substrates similar to the ones described in FIG. 1.

Figure 3:
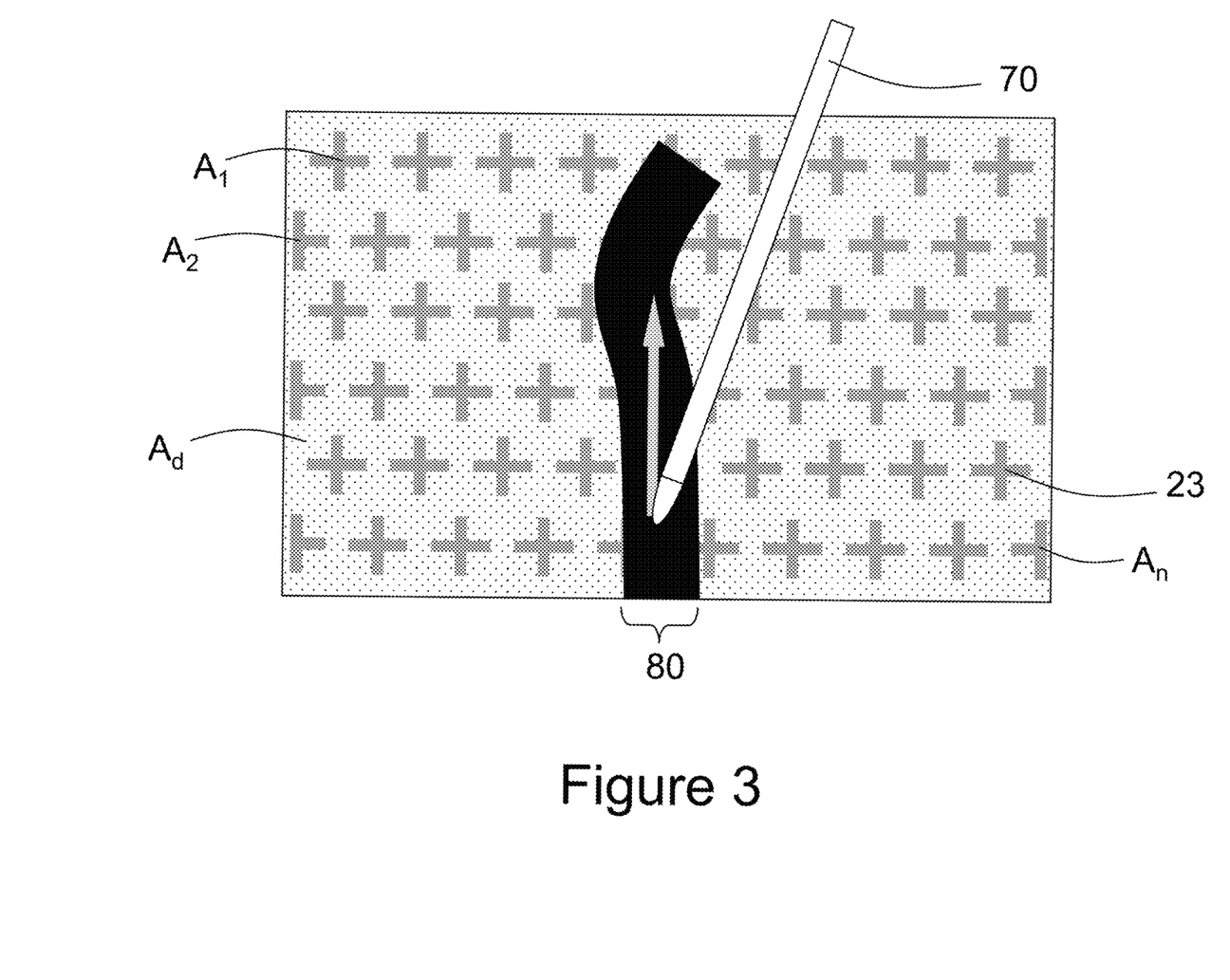
FIG. 3: A top plan view of the writing tablet device showing localization of cholesteric liquid crystal flow by prefabricated ordered crosses.

FIG. 3 schematically explains the localization of cholesteric liquid crystal flow. Under the external pressure imposed by the stylus pen 70 the liquid crystal material flow gets restricted and localized within the area 80. That is, the liquid crystal material flows against and between the spacer structures in the region 80, which restricts flow of the liquid crystal material compared to a display having spacers that do not satisfy the aperture ratio or in which the aperture ratio cannot be determined. The prefabricated spacer structures 23 (crosses) reduce the pressure sensitivity of the device allowing for a fine writing on the surface of the device.

Summarizing, the device described in this disclosure represents a writing tablet display with controlled (restricted) flow of cholesteric liquid crystal allowing for the visualization of writing on the surface switched to the focal conic state (so-called mode B, see for example U.S. Pat. No. 6,104,448 (which is incorporated by reference herein), U.S. Patent Application Publications 2009/0033811 and 2009/0096942, which are incorporated by reference herein) or to the planar state (so-called mode A, see for example U.S. Patent Application Publications 2009/0033811 and 2009/0096942). The device can be composed of one or multiple liquid crystal layers of different colors; the portions of the device can be also selectively erased to restore the original background color (see, for example, U.S. Patent Application Publication 2009/0096942).

The writing tablet of this disclosure will now be described by way of the following examples, which should not be used to limit the invention as defined by the claims.

Example 1:

A cholesteric liquid crystal display writing tablet of size 5 cm×5 cm was assembled from two 2 mil PET substrates with conductive polymer layers. Cholesteric liquid crystal tuned to reflect a blue portion of the spectrum (containing no polymer at all) was premixed with spherical spacers (5 wt. %, 3 µm in diameter yielding $A_d \approx 2500$ mm$^2$, $A_s \approx 250$ mm$^2$. $A_s$ was estimated through the concentration of spacers in total mixture by taking into account the size and density of the distributed spacers and then independently verifying with microscope images. The aperture ratio, $(A_d-A_s)/A_d \approx 0.9$. The mixture was deposited between the substrates. Then two substrates were laminated together to form a cholesteric writing tablet display with a 3 µm gap. The structure of the display was similar to the one shown in FIG. 1 except spherical spacers were used in place of prefabricated posts.

Figure 4:
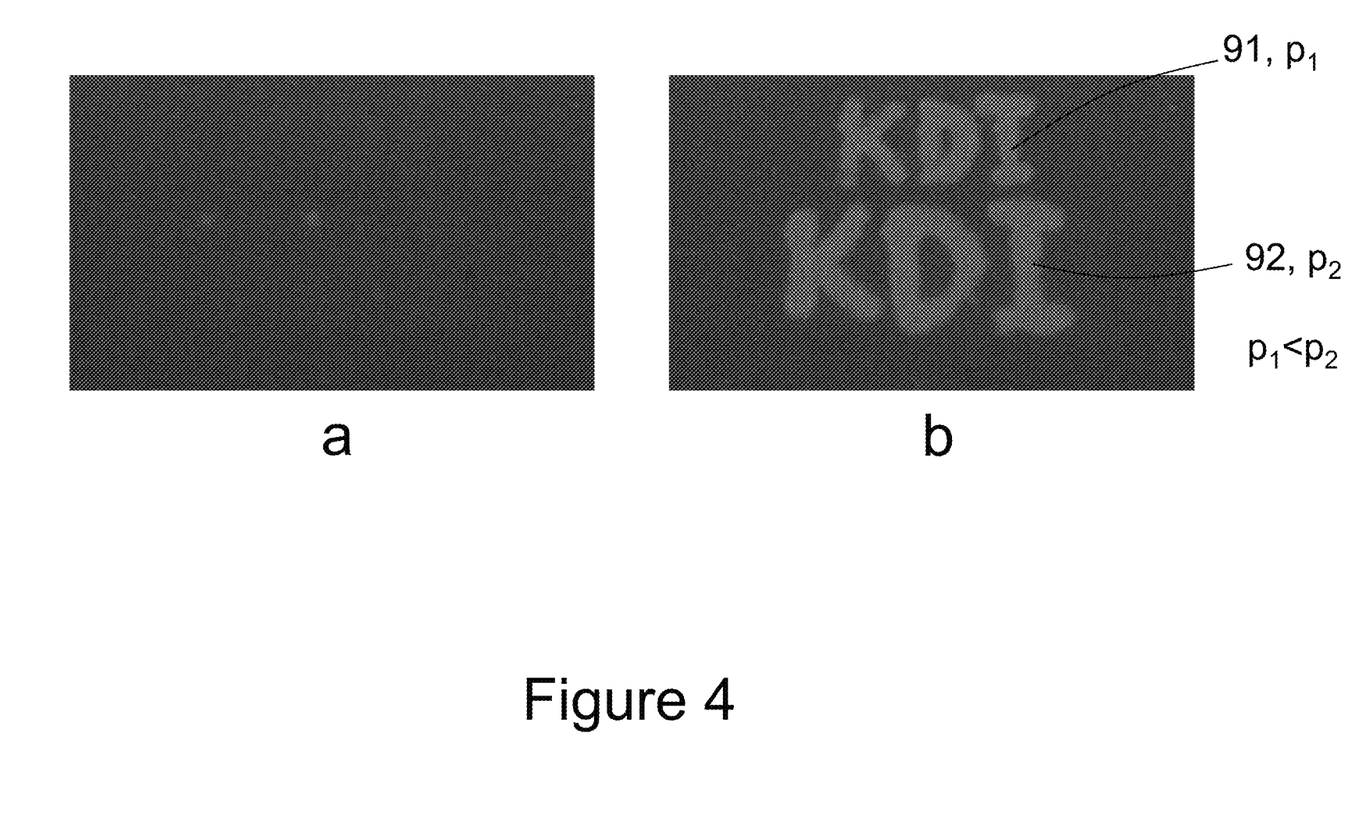
FIG. 4a: Photographs of the cholesteric writing tablet display switched to the uniform focal conic state.
FIG. 4b: Photograph of the cholesteric writing tablet display showing writing on the surface of the display created by a stylus pen with different pressure applied.

FIG. 4 shows photographs of the cholesteric writing tablet display described above switched to the uniform focal conic state (FIG. 4a) and with writing on it (91 and 92) created by a stylus pen 70 with different writing pressure applied (FIG. 4b). The stylus pen 70 used with the writing tablets of this disclosure is free of ink or lead and can be a rigid pointed instrument. The line width can be thinner (writing 91, applied pressure $p_1$) or thicker (writing 92, applied pressure $p_2$) depending on the pressure applied. In this particular case the applied pressure $p_1$ was weaker than the applied pressure $p_2$. The writing can be erased with electric field application placing the display in the initial focal conic state and then the writing can be created again.

Figure 5:
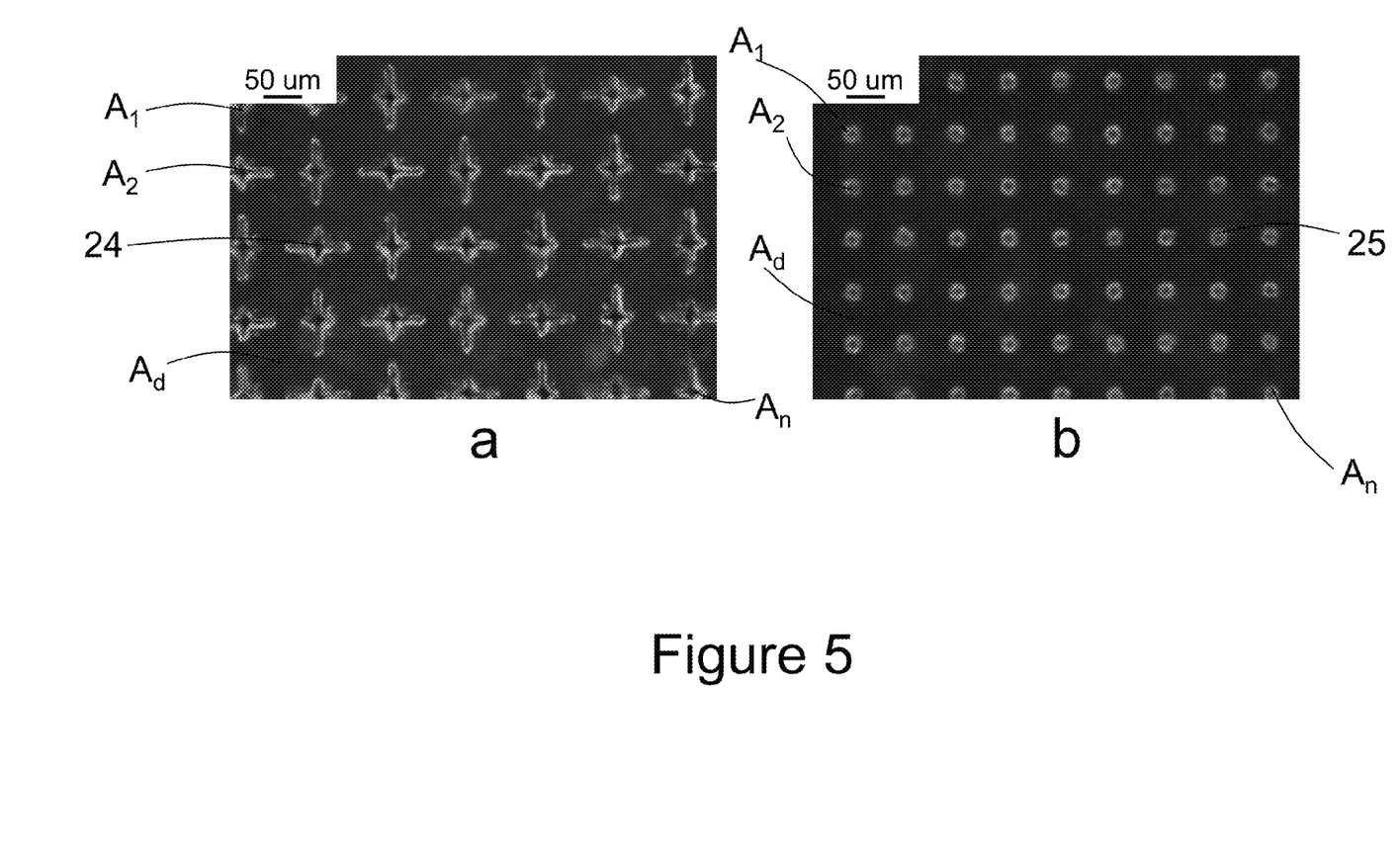
FIG. 5a: Microscope photographs of a writing tablet display with formed prefabricated ordered spacers as asymmetrical crosses.
FIG. 5b: Microscope photographs of a writing tablet display with formed prefabricated ordered spacers as cylindrical posts.
Figure 6:
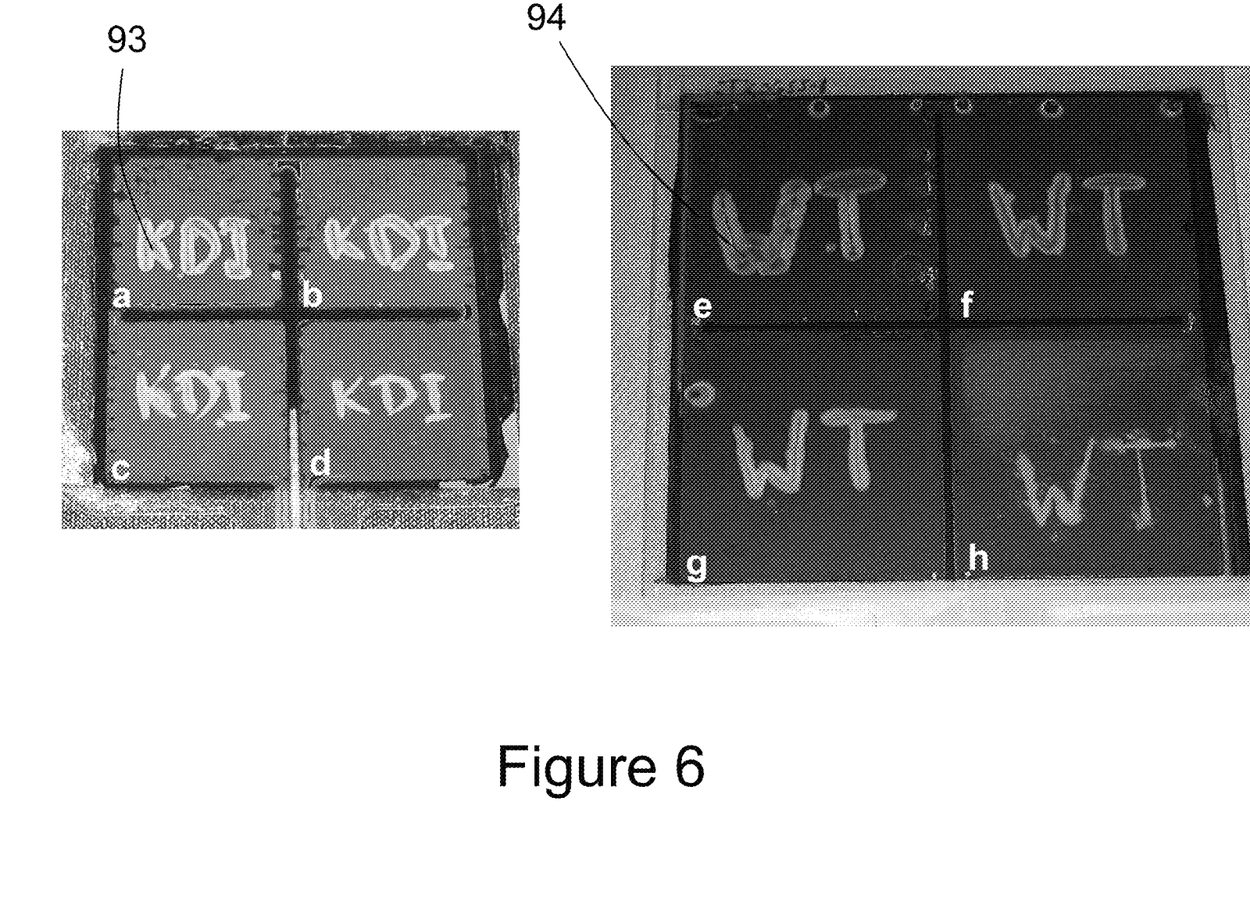

Example 2:

Asymmetrical cross spacer structures that were 100 µm long, 60 µm wide and 4 µm high were periodically deposited on the substrate with the period of 100 µm, for example (shown in the polarizing microscope photographs of FIG. 5a). FIG. 6 shows the photographs of assembled writing tablet devices with prefabricated structures of different shapes (e.g., asymmetrical crosses, FIG. 6a-d) and periods. Other photographs of FIG. 6 are discussed in Example 3. The period of structures becomes smaller from quadrant (a) towards quadrant (d). The smallest period of the prefabricated structures corresponds to the finest line width of the writing (FIG. 6d).

The spacers were made from SU-8 photoresist material on the surface of 5 mil PET plastic with a conductive ITO layer. First, SU-8 photoresist was spincoated on top of ITO plastic, then baked and photo exposed through the shadow mask. The shadow mask had four regions of size 25 mm×25 mm with different periodicity of cross-shaped openings. Photo exposure of SU-8 through the shadow mask followed by an etching process resulted in four different regions with the different periodicity of cross-shaped spacers: 500 µm (FIG. 6a) yielding $A_d \approx 625$ mm$^2$, $A_s \approx 8$ mm$^2$ and an aperture ratio $(A_d-A_s)/A_d \approx 0.98$; 300 µm (FIG. 6b) yielding $A_d \approx 625$ mm$^2$, $A_s \approx 22$ mm$^2$ and an aperture ratio $(A_d-A_s)/A_d \approx 0.96$; 150 µm (FIG. 6c) yielding $A_d \approx 625$ mm$^2$, $A_s \approx 89$ mm$^2$ and an aperture ratio $(A_d-A_s)/A_d \approx 0.85$; and 100 µm (FIG. 5a, FIG. 6d) yielding $A_d \approx 625$ mm$^2$, $A_s \approx 200$ mm$^2$ and an aperture ratio $(A_d-A_s)/A_d \approx 0.68$. After etching, the top 5 mil PET substrate with conductive polymer layer and a gasket material around the perimeter was attached to the substrate with created cross-shaped spacers. The assembled cell was post-cured at elevated temperature in a hot press to: (a) cure the gasket material; (b) force cross-shaped spacers made of SU-8 photoresist to adhere to the top substrate; and (c) set the cell gap of 4 μm.

After assembling the cell was vacuum filled with cholesteric material through the fill port left in the gasket. The cholesteric liquid crystal material was free from all polymer. The cholesteric liquid crystal material was tuned to reflect a green portion of the spectrum. The cholesteric liquid crystal material was initially switched to the focal conic state. Four different regions with the different periodicities of the spacer structures described above resulted in different pressure sensitivity and different line width of the writing. Fabricated spacers not only allowed for control of cholesteric flow but also assured uniform cell gap between electrodes across the cell of around 4 μm. Writing in different regions was created with a stylus pen with approximately the same pressure applied, FIG. 6a-d. The lines were in the planar texture against the focal conic background. The region with the largest period of spacers and largest aperture ratio produced the highest pressure sensitivity and thickest line width of writing 93 (FIG. 6a) while the region with the smallest period of spacers and smallest aperture ratio produced the least pressure sensitivity and thinnest line width (FIG. 6d). The smaller the aperture ratio gives the greater resolution. Smaller pressure sensitivity is desirable for small writing table devices (say, Boogie Board® size) to withstand the pressure applied by hand while writing. However for larger size (say a "white" board), there can be a higher pressure sensitivity as pressure from a hand is typically not applied while writing on the vertically hanging board. Thus the sensitivity really depends on the application. The writing can be erased with electric field application and then the writing can be created again.

Example 3:

Cylindrical spacer structures 20 μm in diameter and 4 μm high were periodically deposited on the substrate with the period of, for example, 70 μm (shown in the polarizing microscope photographs of FIG. 5b). FIG. 6 shows the photographs of assembled writing tablet devices with prefabricated structures of different shapes (e.g., cylindrical posts, FIGS. 6e-h) and periods. The period of structures becomes smaller from quadrant (e) towards (h). The smallest period of the prefabricated spacer structures corresponds to the smallest pressure sensitivity and finest line width of the writing (FIG. 6h).

The spacers were made from SU-8 photoresist material on the surface of 5 mil PET plastic with conductive ITO layer. First, SU-8 photoresist was spincoated on top of ITO plastic, then baked and photo exposed through the shadow mask. The shadow mask had four regions with different periodicity of circular openings. Photo exposure of SU-8 through the shadow mask followed by an etching process resulted in four different regions, 40 mm×40 mm with the different periodicity of cylindrical spacers: 420 μm (FIG. 6e) yielding $A_d \approx 1600$ mm$^2$, $A_s \approx 2.85$ mm$^2$ and an aperture ratio $(A_d-A_s)/A_d \approx 0.99$; 120 μm (FIG. 6f) yielding $A_d \approx 1600$ mm$^2$, $A_s \approx 35$ mm$^2$ and an aperture ratio $(A_d-A_s)/A_d \approx 0.97$; 70 μm (FIG. 5b, FIG. 6g) yielding $A_d \approx 1600$ mm$^2$, $A_s \approx 103$ mm$^2$ and an aperture ratio $(A_d-A_s)/A_d \approx 0.93$; and 40 μm (FIG. 6h) yielding $A_d \approx 1600$ mm$^2$, $A_s \approx 314$ mm$^2$ and an aperture ratio $(A_d-A_s)/A_d \approx 0.80$. After etching, the top 5 mil PET substrate with conductive polymer layer and a gasket material around the perimeter was attached to the substrate with created cylindrical spacers. The assembled cell was post-cured at elevated temperature in a hot press to: (a) cure the gasket material; (b) force cylindrical spacers made of SU-8 photoresist to adhere to the top substrate; and (c) set the cell gap of 4 μm. After assembling, the cell was vacuum filled with cholesteric material through the fill port left in the gasket. The cholesteric liquid crystal material was free from all polymer. The cholesteric liquid crystal material was tuned to reflect a green portion of the spectrum. The cholesteric liquid crystal material was initially in the focal conic state.

Four different regions with the different periodicities of the structures resulted in different pressure sensitivity and different line width of the writing. Fabricated spacers not only allowed for control of cholesteric flow but also assured uniform cell gap between electrodes across the cell of around 4 μm. Writing in different regions was created with a stylus pen with approximately same pressure applied, FIG. 6e-h. The region with the largest period of spacers and highest aperture ratio produced the thickest line width of writing 94 (FIG. 6e) while the region with the smallest period of spacers and the smallest aperture ratio produced the least pressure sensitivity and thinnest line width (FIG. 6h). The smaller the aperture ratio gives the greater resolution. The writing can be erased with electric field application placing all of the liquid crystal material in the focal conic texture and then created again.

Many modifications and variations of the invention will be apparent to those of ordinary skill in the art in light of the foregoing disclosure. Therefore, it is to be understood that, within the scope of the appended claims, the invention can be practiced otherwise than has been specifically shown and described.

What is claimed is:

1. A cholesteric liquid crystal writing tablet comprising:
   a first transparent substrate that is flexible on which a writing pressure is applied and a second substrate spaced apart from said first substrate;
   electrically conductive layers one of which is in contact with said first substrate and is transparent and another of which is in contact with said second substrate, said electrically conductive layers being separated from each other by a cell gap;
   cholesteric liquid crystal material disposed between said electrically conductive layers; and
   spacers disposed in said liquid crystal material that control said cell gap;
   wherein said spacers have a size and concentration in said liquid crystal material that restrict flow of said liquid crystal material when said cell gap is reduced upon application of said writing pressure, thereby forming writing on said writing tablet;
   wherein said spacers satisfy the formula: $0.2 \leq (A_d-A_s)/A_d < 1$, where $A_d$ is an entire writing area of said writing tablet on which the writing can be made and $A_s$ is the total are occupied by all of said spacers as projected on said first substrate or said second substrate within said writing area.

2. The cholesteric liquid crystal writing tablet of claim 1 wherein $0.4 \leq (A_d-A_s)/A_d < 1$.

3. The cholesteric liquid crystal writing tablet of claim 1 wherein $0.2 \leq (A_d-A_s)/A_d \leq 0.9$.

4. The cholesteric liquid crystal writing tablet of claim 1 wherein said spacers are positioned in an ordered pattern in said liquid crystal material.

5. The cholesteric liquid crystal writing tablet of claim 1 wherein said spacers have a non-spherical shape.

6. The cholesteric liquid crystal writing tablet of claim 5 wherein said shape is selected from the group consisting of cylindrical, rectangular, a cross, and a combination thereof.

7. The cholesteric liquid crystal writing tablet of claim 1 wherein said spacers are formed by microembossing, stamping or photolithography.

8. The cholesteric liquid crystal writing tablet of claim 1 wherein said spacers are thermally bonded to at least one of said electrically conductive layers or adhered to at least one of said electrically conductive layers with adhesive.

9. The cholesteric liquid crystal writing tablet of claim 1 wherein said spacers are disposed directly on or as part of at least one of said first substrate and said second substrate, or on at least one of said electrically conductive layers.

10. The cholesteric liquid crystal writing tablet of claim 1 wherein said spacers have a height that is greater than or equal to said cell gap.

11. The cholesteric liquid crystal writing tablet of claim 10 wherein said spacers may be flexible or rigid.

12. The cholesteric liquid crystal writing tablet of claim 1 wherein some of said spacers have a height that is approximately the same as said cell gap while others of said spacers have a height smaller than said cell gap.

13. The cholesteric liquid crystal writing tablet of claim 1 comprising a layer of alignment material in contact with said liquid crystal material.

14. The cholesteric liquid crystal writing tablet of claim 1 wherein said spacers are thermally bonded to an alignment layer material, or adhered to or formed on said alignment layer material.

15. The cholesteric liquid crystal writing tablet of claim 1 comprising drive electronics for placing said liquid crystal material into a focal conic texture or a planar texture as an initial state or to assist in forming the writing on said writing tablet.

16. The cholesteric liquid crystal writing tablet of claim 1 comprising a light absorbing layer positioned to absorb light passing through said liquid crystal material.

17. The cholesteric liquid crystal writing tablet of claim 1 wherein said first substrate comprises flexible polymer.

18. The cholesteric liquid crystal writing tablet of claim 1 comprising multiple stacked liquid crystal layers comprising liquid crystal material.

19. The cholesteric liquid crystal writing tablet of claim 18 wherein said liquid crystal material of one of said liquid crystal layers reflects light of a different color than said liquid crystal material of another of said liquid crystal layers.

20. The cholesteric liquid crystal writing tablet of claim 19 wherein a first of said liquid crystal layers reflects red light, a second of said liquid crystal layers reflects green light and a third of said liquid crystal layers reflects blue light, in any order.

21. The cholesteric liquid crystal writing tablet of claim 1 wherein said cholesteric liquid crystal material in said writing tablet is bistable.

22. The cholesteric liquid crystal writing tablet of claim 1 comprising a stylus for applying said writing pressure, said stylus being free of lead or ink.

23. A cholesteric liquid crystal writing tablet comprising:
a first substrate that is flexible on which a writing pressure is applied and a second substrate spaced apart from said first substrate;
electrically conductive layers one of which is in contact with said first substrate and another of which is in contact with said second substrate, said electrically conductive layers being separated from each other;
cholesteric liquid crystal material disposed between said electrically conductive layers; and
spacers disposed in said liquid crystal material;
wherein said spacers satisfy the formula: $0.2 \leq (A_d - A_s)/A_d \leq 0.9$, where $A_d$ is an entire writing area of said writing tablet that can be written on due to application of the writing pressure and $A_s$ is the total area occupied by all of said spacers as projected on said first substrate or said second substrate within said writing area.

24. The cholesteric liquid crystal writing tablet of claim 23 wherein said spacers are positioned in an ordered pattern in said liquid crystal material.

25. The cholesteric liquid crystal writing tablet of claim 23 comprising drive electronics for placing said liquid crystal material into a focal conic texture or a planar texture as an initial state or to assist in writing on said writing tablet.

* * * * *